(12) United States Patent
Choksi et al.

(10) Patent No.: US 12,052,653 B1
(45) Date of Patent: Jul. 30, 2024

(54) CONVERGED ACCESS COMMUNICATION SYSTEMS AND ASSOCIATED METHODS

(71) Applicant: Cable Television Laboratories, Inc., Louisville, CO (US)

(72) Inventors: Ojas Choksi, Louisville, CO (US); John Kim, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 144 days.

(21) Appl. No.: 17/493,606

(22) Filed: Oct. 4, 2021

Related U.S. Application Data

(60) Provisional application No. 63/087,073, filed on Oct. 2, 2020.

(51) Int. Cl.
  *H04W 48/16* (2009.01)
  *H04W 8/20* (2009.01)
(52) U.S. Cl.
  CPC .............. *H04W 48/16* (2013.01); *H04W 8/20* (2013.01)
(58) Field of Classification Search
  CPC ................................ H04W 48/16; H04W 8/20
  USPC ......................................................... 455/434
  See application file for complete search history.

(56) References Cited

U.S. PATENT DOCUMENTS

| | | | | |
|---|---|---|---|---|
| 2006/0156392 | A1* | 7/2006 | Baugher | G06F 21/10 726/5 |
| 2007/0250751 | A1* | 10/2007 | Cai | H04L 1/008 714/748 |
| 2017/0111423 | A1* | 4/2017 | Cui | H04N 21/44227 |
| 2018/0198733 | A1* | 7/2018 | Morgan | H04L 43/0876 |
| 2021/0099277 | A1* | 4/2021 | Cioffi | H04L 5/0005 |
| 2021/0377109 | A1* | 12/2021 | Shrivastava | H04L 12/4625 |

* cited by examiner

*Primary Examiner* — Joel Ajayi
(74) *Attorney, Agent, or Firm* — PdZ Patent Law, PLLC

(57) ABSTRACT

A method for access communication network convergence includes (1) obtaining subscription policy information associated with a network client capable of being served by a plurality of access communication networks, (2) obtaining network characteristics representing operating state of each of the plurality of access communication networks, and (3) assigning data flowing between the network client and a hub to one or more of the plurality of access communication networks at least partially based on the subscription policy information and the network characteristics. The plurality of access communication networks include, for example, a wireless access communication network and a wireline access communication network.

14 Claims, 12 Drawing Sheets

CONVERGED ACCESS COMMUNICATION SYSTEMS AND ASSOCIATED METHODS

RELATED APPLICATIONS

This application claims benefit of priority to U.S. Provisional Patent Application Ser. No. 63/087,073, filed on Oct. 2, 2020, which is incorporated herein by reference.

BACKGROUND

Access communication networks provide Internet access and other services to end users, such as residences and businesses. Access communication networks are also increasingly being used to provide backhaul, mid-haul, and/or front-haul communication services to wireless base stations, especially to cellular "small cell" wireless base stations. Access communication networks can be classified as wireline access communication networks or wireless access communication networks. Examples of wireline access communication networks include, but are not limited to, hybrid fiber coaxial (HFC) based cable access communication networks, optical access communication networks, digital subscriber line (DSL) access communication networks, and powerline access communication networks. Examples of wireless access communication networks include, but are not limited to, cellular access communication networks, Wi-Fi access communication networks, satellite access communication networks, Bluetooth access communication networks, LoRa access communication networks, and Zigbee access communication networks.

DETAILED DESCRIPTION OF THE EMBODIMENTS

Figure 1:
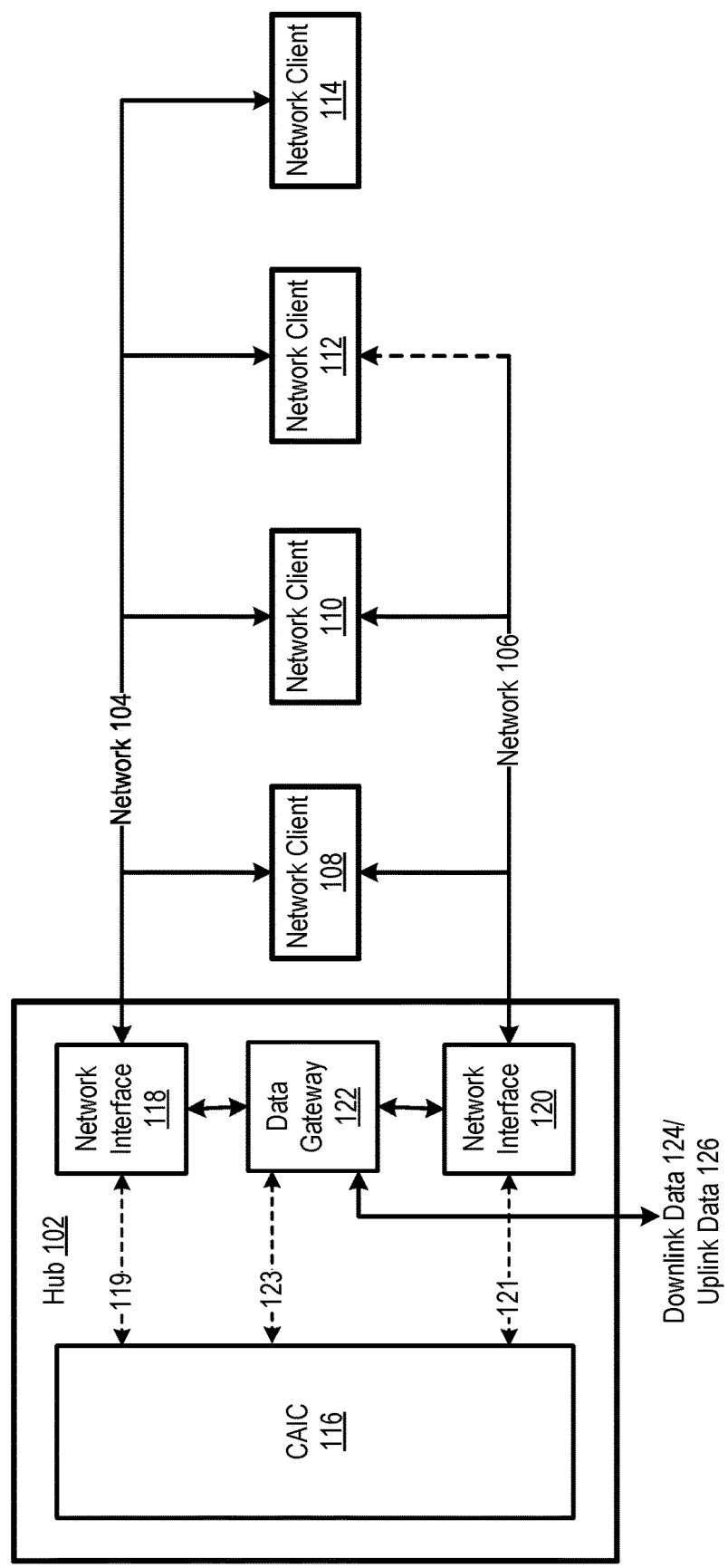
FIG. 1 is a block diagram of a converged access communication system, according to an embodiment.

It is common for two or more access communication networks to be available at a given location, such as at an end user's residence or business, or in a public mall. For example, wireline and wireless access communication networks may be available to an end user at a given location. However, conventional access communication networks are siloed in nature such that they cannot readily work together. For example, consider a residential end user having access to both a cable access communication network and a cellular access communication network at the user's residence. It would be advantageous if these two communication networks could work together to serve common network clients at the user's residence. For instance, the two access communication networks could potentially provide the network clients better service, e.g., higher bandwidth, higher reliability, and/or lower latency, than a single access communication network. Additionally, a network operator may benefit from being able to serve the network clients at the user's residence via the two different access communication networks, such as by realizing increased data transmission flexibility and/or lower data transmission cost. It is not conventionally feasible, however, for these two access communication networks to work together due to their siloed nature. The Third Generation Partnership Project (3GPP) has specified an access traffic steering, switching and splitting (ATSSS) function to enable steering and splitting of traffic across wireline and wireless access technologies. However, ATSSS lacks an intelligence function to facilitate efficient utilization of all available resources on a near real-time basis.

Disclosed herein are converged access communication systems and associated methods which at least partially overcome the above-discussed drawbacks of ATSSS. Certain embodiments of the new systems include a converged access integrated controller (CAIC) which enables two or more access communication networks to efficiently work together to serve common network clients, thereby achieving access communication network convergence. Some embodiments are configured to leverage two or more available access communication networks to provide better service to a network client than would be feasible using a single access communication network, such as by dynamic switching, steering, and/or splitting of data associated with the network client across two or more access communication networks. In some embodiments, an ATSSS module under control of a CAIC switches, steers, and/or splits data across a plurality of access communication networks based on a network client's capabilities, associated subscription policy information, and telemetry data on utilization and/or forecast of traffic demand of each access communication network. Additionally, certain embodiments of the CAIC are configured to help optimize data transport cost and/or end user experience on real-time, or near real-time, basis. Furthermore, particular embodiments of the CAIC are extensible such that network operators can innovate, develop, and implement custom algorithms, thereby optimizing the new systems and methods for their particular applications.

FIG. 1 is a block diagram of a converged access communication system 100, which is one embodiment of the new converged access communication systems disclosed herein. Communication system 100 includes a hub 102, an access communication network 104, an access communication network 106, and a plurality of network clients 108, 110, 112, and 114. In some embodiments, hub 102 represents a local or regional point of presence for one or more communication system operators. The number of access communication networks, as well as the number of network clients, in communication system 100 may vary, as long as communication system 100 includes at least two access communication networks. Hub 102 includes a CAIC 116, a network interface 118, a network interface 120, and a data gateway 122. Hub 102 need not be a physical structure and could instead represent a logical grouping of its constituent elements. Accordingly, CAIC 116, network interface 118, network interface 120, and data gateway 122 need not be collocated. Additionally, any of the elements of hub 102 could be split into multiple sub-elements which also need not be collocated. Furthermore, two or more elements of hub 102 could be partially or fully combined. Moreover, hub 102 could include additional elements without departing from the scope hereof.

CAIC 116 is configured to achieve convergence of access communication networks of system 100, e.g., access communication networks 104 and 106, as discussed below. Dashed lines 119, 121, and 123 represent logical connections between CAIC 116 and network interface 118, network interface 120, and data gateway 122, respectively. Network interfaces 118 and 120 are configured to provide an interface to access communication networks 104 and 106, respectively. Embodiments of system 100 including additional access communication networks (not shown) may include a respective network interface (not shown) for each additional access communication network. Examples of network interfaces 118 and 120 include, but are not limited to, a termination system (e.g., a wireline or wireless modem termination system (e.g., a CMTS), an optical line terminal (OLT), etc.), portions of a split wireless base station (e.g., a radio access distributed unit and a centralized unit, a Wi-Fi access point), a network core (e.g., a cellular wireless network core, a Wi-Fi wireless network core, etc.), a network central office, an optical splitter, an optical concentrator, a router, a switch, and a wireless access point. Based on directions from CAIC 116, data gateway 122 steers, switches, and/or splits a downlink data stream 124 among access communication networks 104 and 106 via respective network interfaces 118 and 120. Data gateway 122 is further configured to combine uplink data from access communication networks 104 and 106 into a single uplink data stream 126. "Steering" data refers to selecting a best communication link to use for transmitting the data, "switching" data refers handing over transmission of the flow from one communication link to another without interruption, and "splitting" data refers to simultaneous use of two or more communication links to transmit the data. In certain embodiments, network clients 108, 110, 112 and 114 are configured to provide statistics to and receive policies from CAIC 116 and/or other network elements with which CAIC 116 interacts with.

Each access communication network 104 and 106 is configured to transmit data between hub 102 and one or more network clients. Specifically, access communication network 104 is configured to transmit data between network interface 118 and one or more network clients, and access communication network 106 is configured to transmit data between network interface 120 one or more network clients. Each access communication networks 104 and 106 is either a wireline access communication network or a wireless access communication network. Examples of possible wireline access communication networks include, but are not limited to, cable access communication networks (e.g., operating according to a Data Over Cable Service Interface Specification (DOCSIS) data transmission protocol), optical access communication networks (e.g., operating according to an ethernet passive optical network (EPON) data transmission protocol, a radio frequency over glass (RFOG) data transmission protocol, or a gigabit passive optical network (GPON) data transmission protocol), digital subscriber line (DSL) access communication networks, and powerline access communication networks. Examples of possible wireless access communication networks include, but are not limited to, cellular access communication networks (e.g., operating according to a long term evolution (LTE) data transmission protocol, a fifth generation (5G) new radio (NR) data transmission protocol, or a sixth generation (6G) data transmission protocol) operating in licensed and/or unlicensed radio frequency spectrum (including Citizens Broadband Radio Service (CBRS) radio frequency spectrum), Wi-Fi access communication networks (e.g., operating according to an Institute of Electrical and Electronics Engineers (IEEE) 802.11 data transmission protocol), satellite access communication networks (e.g., using very low each orbit (VLEO) satellites, low earth orbit (LEO) satellites, medium earth orbit (MEO) satellites, or geostationary equatorial orbit (GEO) satellites), Bluetooth access communication networks, LoRa access communication networks, and Zigbee access communication networks.

In some embodiments, access communication networks 104 and 106 are different types of access communication networks. For example, in certain embodiments, access communication network 104 is a wireline access communication network, and access communication network 106 is a wireless access communication network, or vice versa. As another example, in certain embodiments, access communication networks 104 and 106 are different types of wireless access communication networks (e.g., cellular and satellite networks, cellular and WiFi networks, or satellite and WiFi networks) or different types of wireline access communication networks (e.g., cable and optical networks, cable and DSL networks, optical and DSL networks). However, access communication networks 104 and 106 could be two instances of a common type of access communication network without departing from the scope hereof. Access communication networks 104 and 106 may share one or more common elements, such as discussed below with respect to FIGS. 7, 10, and 12. Additionally, each access network 104 and 106 need not be capable of serving all client devices 108-114 in communication system 100. For example, FIG. 1 illustrates access communication network 104 being capable of serving all client devices 108-114 and access communication network 106 being capable of serving only client devices 108-112. Such disparity in coverage of access communication networks 104 and 106 is caused, for example, by difference in access communication network size and/or access communication network technology. For instance, access network 104 could be a wireline access communication network capable of serving all end users in its service area while access communication 106 could be a wireless access communication network capable of serving only end users within sufficient proximity to its wireless base stations.

Each network client 108-114 is located, for example, at a different end user's location, such as at a different residence or business. In some embodiments, each network client 108-114 includes one or more of a gateway, a modem, a mobile telephone, a computer, a set-top device, a data storage device, an Internet of Things (IoT) device, an entertainment device, a computer networking device, a smartwatch, a wearable device with wireless capability, a medical device, a security device, a monitoring device, a virtual client device, and a wireless access device (including, for example, an eNB, a gNB, a Wi-Fi-based wireless access point, an IAB access point, a microcell, a picocell, a femtocell, a macrocell, a Wi-Fi-based application, a satellite communication device, etc). Additionally, one or more network clients 108-114 may include a plurality of devices, such as two or more of the above-discussed devices connected to a gateway, set-top device, access point, switch, router, hub, etc.

Each network client 108-114 has access to one or more of access communication networks 104 and 106 in communication system 100. Specifically, in the FIG. 1 example, each of network clients 108 and 110 has access to both of access communication networks 104 and 106, as illustrated by the network clients being connected to each of the two access communication networks. Network client 114, in contrast, has access to only access communication network 104, and network client 114 is accordingly illustrated as being connected to solely access communication network 104. Network client 112, in turn, has access to each of access communication networks 104 and 106, as illustrated by network client 112 being connected to both of these access communication networks. However, access communication network 106 is only capable of providing downlink data transmission to network client 112, instead of being capable of providing both uplink and downlink data transmission to network client 112, as symbolically shown by network client 112 being connected to access communication network 106 via a dashed line, instead of via a solid line.

CAIC 116 is configured to assign data flowing between client devices 108-114 and hub 102 to available access communication networks, e.g., to access communication networks 104 and 106, such as based one or more of capabilities of network clients 108-114, subscription policies, and network characteristics. Accordingly, CAIC 116 achieves convergence of access communication networks 104 and 106, i.e., it enables the two access communication networks to work together to serve common network clients.

Figure 2:
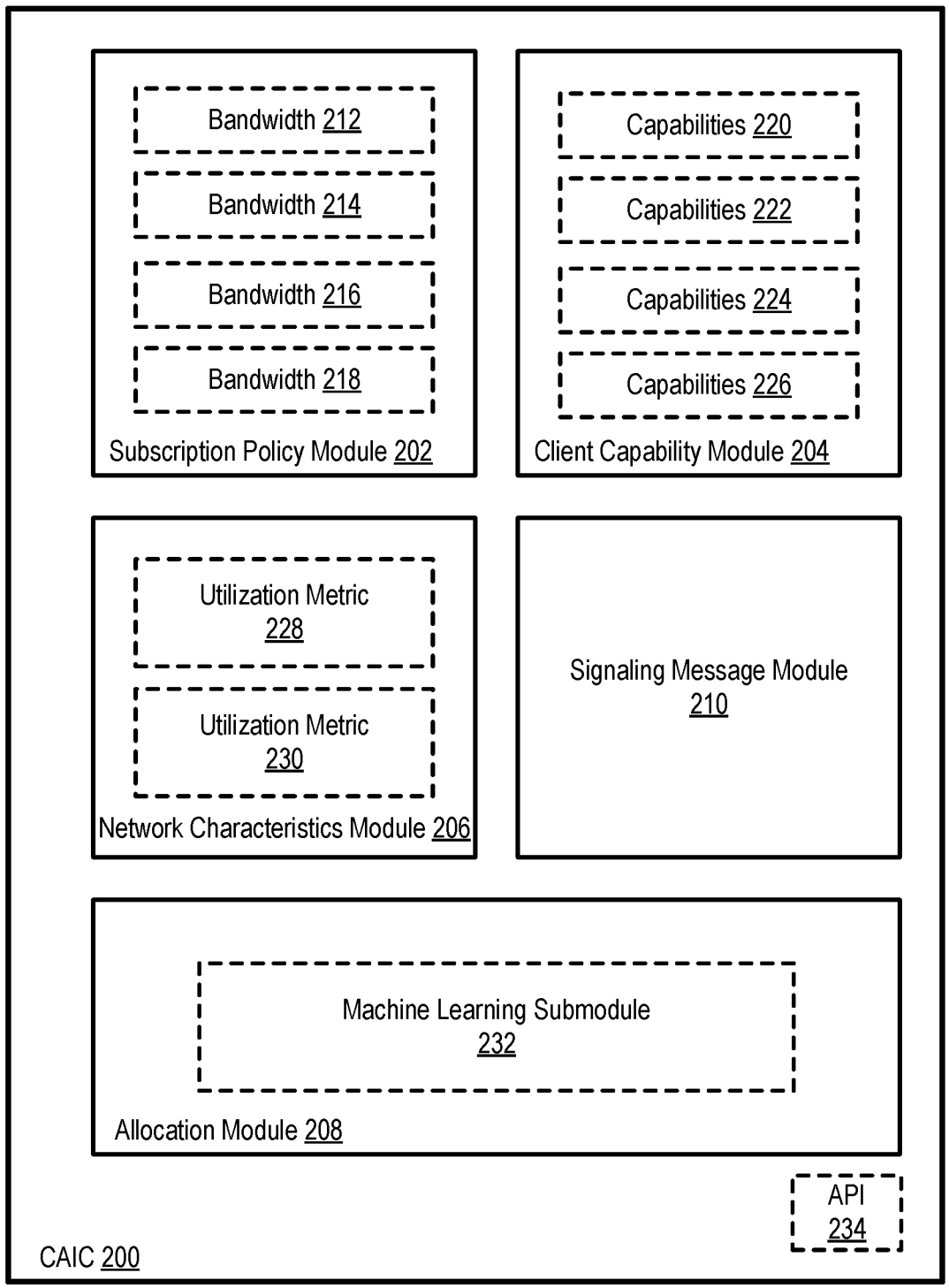
FIG. 2 is a block diagram of a converged access integrated controller (CAIC), according to an embodiment.

FIG. 2 is block diagram of a CAIC 200, which is one possible embodiment of CAIC 116 of FIG. 1. CAIC 200 includes a subscription policy module 202, a client capability module 204, a network characteristics module 206, an allocation module 208, and an optional signaling message module 210. The modules of CAIC 200 are implemented, for example, by analog electronic circuitry and/or digital electronic circuitry. In some embodiments, some or all of the modules of CAIC 200 are implemented by one or more processing devices (not shown) executing instructions, such as in the form of software and/or firmware, stored in one or more data stores (not shown), to perform the functions of the modules. The elements of CAIC 200 need not be collocated. For example, some embodiments of CAIC 200 are at least partially implemented by a distributed computing system. Additionally, two or more modules of CAIC 200 could be partially or fully combined. Furthermore, the modules may interface with other network elements to retrieve requisite information, such as described below.

Subscription policy module 202 is configured to obtain subscription policy information associated with network clients 108-114. Subscription policy module 202 obtains subscription policy information, for example, from a data store (not shown) within or accessible to subscription policy module 202, or from an external source (not shown). Subscription policy information for a given network client specifies, for example, what level of service the network client is entitled to receive in communication system 100. One example of subscription policy information is provisioned bandwidth, and FIG. 2 illustrates network clients 108-114 having respective provisioned bandwidths 212-218. Provisioned bandwidth is a maximum bandwidth provisioned to each network client 108-114. For example, assume that a subscriber associated with network client 108 subscribes to a "gold" service plan offering a bandwidth of up to 1,000 Megabits per second (Mbps), a subscriber associated with network client 110 subscribes to a "silver" service plan offering a bandwidth of up to 500 Mbps, a subscriber associated with network client 112 subscribes to the gold service plan, and a subscriber associated with network client 114 subscribers to a "bronze" service plan offering a bandwidth of up to 100 Mbps. In this example, provisioned bandwidth 212 would specify 1,000 Mbps for network client 108, provisioned bandwidth 214 would specify 500 Mbps for network client 110, provisioned bandwidth 216 would specify 1,000 Mbps for network client 112, and provisioned bandwidth 218 would specify 100 Mbps for network client 114.

Subscription policy information obtained by subscription policy module 202 could include information in addition to, or in place of, provisioned bandwidth. Examples of other possible subscription policy information include, but are not limited to, access traffic steering, switching and/or splitting restrictions, maximum data transfer latency specifications, time of day and/or day of week use restrictions, priority information, geographic use restrictions, and data type restrictions. Traffic steering, switching and/or splitting restriction specifies, for example, whether multiple accesses can be leveraged or not. Maximum data transfer latency specifications include, for example, a guaranteed maximum latency when transferring data between hub 102 and a network client 108-114, or whether a given network client 108-114 is entitled to low-latency data transmission between the network client and hub 102. Time of day and/or day of week use restrictions specify, for example, when a given network client 108-114 is entitled to use communication system 100, or when a given network client 108-114 is not entitled to use communication system 100. Priority information specifies, for example, priority of a given network client 108-114 for purposes of allocating access communication network capacity. Geographic use restrictions specify, for example, whether a given network client 108-114 is entitled, or not entitled, to use communication system 100 in a given geographic area. Data type restrictions specify, for example, types of data that will be transmitted, or will not be transmitted, between a given network client 108-114 and hub 102.

Client capability module 204 is configured to obtain respective capabilities 220-226 for each network client 108-114. Client capability module 204 obtains capabilities 220-226, for example, from a data store (not shown) within or accessible to client capability module 202, or from an external source (not shown). Capabilities 220-226 specify, for example, data transmission protocols and/or physical (PHY) layer types supported by respective network clients 108-114. For example, assume that network client 108 supports DOCSIS 3.1, LTE, and 5G NR data transmission protocols and that network client 110 supports DOCSIS 3.0 and LTE data transmission protocols. Capabilities 220 would accordingly specify DOCSIS 3.1, LTE, and 5G NR for network client 108, while capabilities 222 would specify DOCSIS 3.0 and LTE for network client 110.

Network characteristics module 206 is configured to obtain network characteristics representing operating state of each of access communication networks 104 and 106. Network characteristics module 206 obtains network characteristics, for example, from a data store (not shown) within or accessible to network characteristics module 206, from an optional network monitoring module (not shown) within or accessible to CAIC 200, or from an external source (not shown). Examples of network characteristics include, for example, network utilization, and FIG. 2 accordingly illustrates network characteristics module 206 obtaining network utilization metrics 228 and 230. Network utilization metric 228 represents real-time, or near real-time, utilization of access communication network 104, and network utilization metric 230 represents real-time, or near real-time, utilization of access communication network 106. Network utilization metrics 228 and 230 are expressed, for example, in a quantitative manner (e.g., percent utilization) or in a qualitative manner (e.g., low, medium, or high utilization). Additionally, network utilization metrics 228 and 230 may represent overall utilization of their respective access networks, or network utilization metrics 228 and 230 may include a plurality of components representing utilization of respective portions (e.g., nodes or wireless base stations) of their respective access communication networks. Furthermore, network utilization metrics 228 and 230 may include a plurality of components each representing utilization of network resources by individual network clients connected to their respective access communication networks.

Network characteristics obtained by network characteristics module 206 could include information in addition to, or in place of, access communication network utilization. Examples of other possible network characteristics include, but are not limited to, network health, network cost, network use policies, and forecasted network demand. Network health indicates, for example, whether an access communication network is operating properly, and network cost indicates, for example, current and/or future cost to transport data via the access communication network. Network use policies specify, for example, polices governing use of access communication networks, e.g., communication network 106 is to be used under certain conditions or access communication network 106 is not to be used under certain conditions. Forecasted network demand indicates, for example, forecasted traffic demand on each of communication networks 104 and 106 and/or forecasted traffic demand by one or more clients served by communication networks 104 and 106, such as forecasted traffic demand generated using one or more artificial intelligence techniques.

Allocation module 208 is configured to assign data flowing between network clients 108-114 and hub 102 to one or more of access communication networks 104 and 106 at least partially based on one or more of (a) subscription policy information, as obtained by subscription policy module 202, (b) capabilities of network clients 108-114, as obtained by client capability module 204, and (c) network characteristics, as obtain by network characteristics module 206. Assigning data to access communication networks 104 and 106 may include one or more of switching data between the access communication networks, steering data between the access communication networks, and splitting data among the access communication networks. Allocation module 208 assigns data to access communication networks 104 and 106, for example, by (a) cooperating with data gateway 122 for downlink traffic and network clients 108-114 for uplink traffic to switch, steer, and/or split between access communication networks 104 and 106 and (b) cooperating with respective network interfaces 118 and 120 to schedule transmission of data from data gateway 122 on their respective access communication networks. In some embodiments, allocation module 208 is capable of assigning data to access communication networks 104 and 106 on an application level or even on a data flow level. For instance, in some embodiments, allocation module 208 is capable of assigning two different data flows associated with a common network client to different respective access communication networks. In some alternate embodiments, one or more functions of allocation module 208 can be performed by an external network element (e.g. signaling the data assignment policies to the data gateway 122 via an external policy server) under the direction of the allocation module 208.

The manner that allocation module 208 assigns data flowing to access communication networks 104 and 106 is implementation dependent, but the following are several examples of possible assignment methods that could be implemented by allocation module 208:

Example 1—High Performance Assignment Method

In this example, allocation module 208 assigns data to communication networks 104 and 106 in a manner which most closely achieves provisioned bandwidths 212-218 of network clients 108-114, considering client capabilities 220-226 and utilization metrics 228 and 230. For example, assume that utilization metrics 228 and 230 indicate that access communication network 104 has a high utilization, e.g., 80 percent or higher, while access communication network 106 has a low utilization, e.g., 40 percent or lower. Allocation module 208 may accordingly assign data to access communication network 106 when possible, to leave the relatively limited remaining capacity of access network communication network 104 for network clients that cannot be served by access communication network 106. For example, allocation module 208 may assign all downlink traffic destined for network client 108 to access communication network 106, split traffic destined for network clients 110 and 112 between networks 104 and 106 to reserve adequate capacity of access communication network 104 for network client 114 which is not served by access communication network 106.

Example 2—High Reliability Assignment Method

In this example, allocation module 208 assigns data to communication networks 104 and 106 in a manner which helps achieve high reliability for one or more of network clients 108-114. For example, assume that network client 108 requires high reliability, such as specified by subscription policy information associated with network client 108. Allocation module 208 may accordingly assign or duplicate data to communication networks 104 and 106 in a manner which ensures that each of access communication networks 104 and 106 has sufficient capacity to fully support network client 108, thereby helping ensure that data gateway 122 and network client 108 can instantly switch or combine and receive reliable service in the event of failure of one of access communication networks 104 and 106.

Example 3—Priority Assignment Method

In this example, allocation module 208 assigns data to access communication networks 104 and 106 in a manner which helps ensure that network clients deemed highest priority based on their subscription receive needed network resources. For example, assume that subscription policy information indicates that network client 110 is a high priority client, network clients 112 and 114 are medium priority clients, and network client 108 is a low priority client. Allocation module 208 may accordingly assign data to access communication networks 104 and 106 in a manner which ensures that network client 110's needs are met before addressing needs of any other network clients. Allocation module 208 may next assign data associated with network clients 112 and 114 to access communication networks 104 and 106 because these network clients are medium priority clients. Allocation module 208 may finally assign data associated with network client 108 to access communication networks 104 and 106 after the needs of network clients 110-114 have been met, because network client 108 is a low priority client.

Example 4—Low-Cost Assignment Method

In this example, allocation module 208 assigns data to access communication networks 104 and 106 in a manner which helps minimize cost of transporting the data. For example, assume that access communication network 106 has been determined to have a higher cost of use than access communication network 104 at an instance in time. Allocation module 208 may accordingly assign as much data to access communication network 104 as possible, to minimize use of relatively expensive access communication network 106.

Example 5—Data Type Assignment Method

In this example, allocation module 208 assigns data to access communication networks 104 and 106 at least partially based on a type of data to be transmitted. For example, assume that first and second data flows need to be transmitted between hub 102 and network client 108, where the first data flow is associated with video data and the second data flow is associated with file transfer data. Additionally, assume that (a) access communication network 104 is better suited for transmitting video data than access communication network 106 and (b) access communication network 106 is better suited for transmitting file transfer data than access communication network 104. Allocation module 208 may accordingly assign the first data flow to access communication network 104 and the second data flow to access communication network 106, so that each type of data is handled by the most-suitable network for the data.

Example 6—Data Direction Assignment Method

In this example, allocation module 208 assigns data to access communication networks 104 and 106 at least partially based on a direction of the data, i.e., whether the data is downlink data (being transmitted from hub 102 to a network client) or uplink data (being transmitted from a network client to hub 102). For example, assume that access communication network 106 has greater uplink capacity than access communication network 104. Allocation module 208 may accordingly assign uplink data to access communication network 106, when possible, to leverage the relatively large uplink capacity of access communication network 106.

Example 7—Hybrid Assignment Method

In this example, allocation module 208 assigns data to communication networks 104 and 106 in a manner which pursues two or more goals, such as two or more of the goals of Examples 1-6 above. The goals may be equally weighted or unequally weighted during the assignment process.

Referring again to FIG. 2, some embodiments of allocation module 208 are configured to assign data to access communication networks 104 and 106 according to predetermined instructions, such as one or more predetermined algorithms. However, some other embodiments of allocation module 208 are configured to assign data to access communication networks 104 and 106 using artificial intelligence. For example, some embodiments of allocation module 208 include a machine learning submodule 232 configured to assign data to access communication networks 104 and 106. Machine learning submodule 232 includes, for instance, one or more neural networks that are trained with example assignments of data to access communication networks 104 and 106, such that the neural networks become capable of automatically assigning data to the access communication networks based one or more desired goals and information obtained from subscription policy module 202, client capability module 204, and/or network characteristics module 206.

Optional signaling message module 210 is configured to control forwarding of data transmission signaling messages from one access communication network to another access communication network at hub 102. Data transmission signaling messages include, but are not limited to, messages acknowledging receipt of data and/or other control plane signaling. Signaling message module 210 is used, for example, in embodiments where an access communication network, or a portion of an access communication network, is unidirectional, such that either upstream or downstream data transmission signaling messages must be transmitted by another access communication network. In some embodiments, signaling message module 210 is configured to remove data transmission protocol information associated with an access communication network transmitting the message, before the message is forwarded to another access communication network. One example application of signaling message module 210 is discussed below with respect to FIG. 5.

Some embodiments of CAIC 200 are customizable, such as to enable an operator to customize CAIC 200 for its application. For example, certain embodiments enable an operator to implement custom algorithms in allocation module 208, such as to adapt allocation module 208 to the operator's communication system, the operator's goals, and/or the operator's system operation experience. As another example, particular embodiments of CAIC 200 enable an operator to customize one or more of subscription policy module 202, client capability module 204, and network characteristics module 206, such as based on the operator's communication system, the operator's goals, and/or the operator's system operation experience. Accordingly, allocation module 208 optionally further includes an application programming interface (API) 234 to enable customization of CAIC 200, such as to enable an operator to implement custom algorithms in CAIC 200.

Discussed below with respect to FIGS. 3-6 are examples of how CAIC 116 could assign data to access communication networks 104 and 106. It is understood, though, that CAIC 116 is not limited to operating according to these examples, and actual assignment of data in a communication system including a CAIC will be implementation dependent, as well as dependent on current operating conditions of the communication system.

Figure 3:
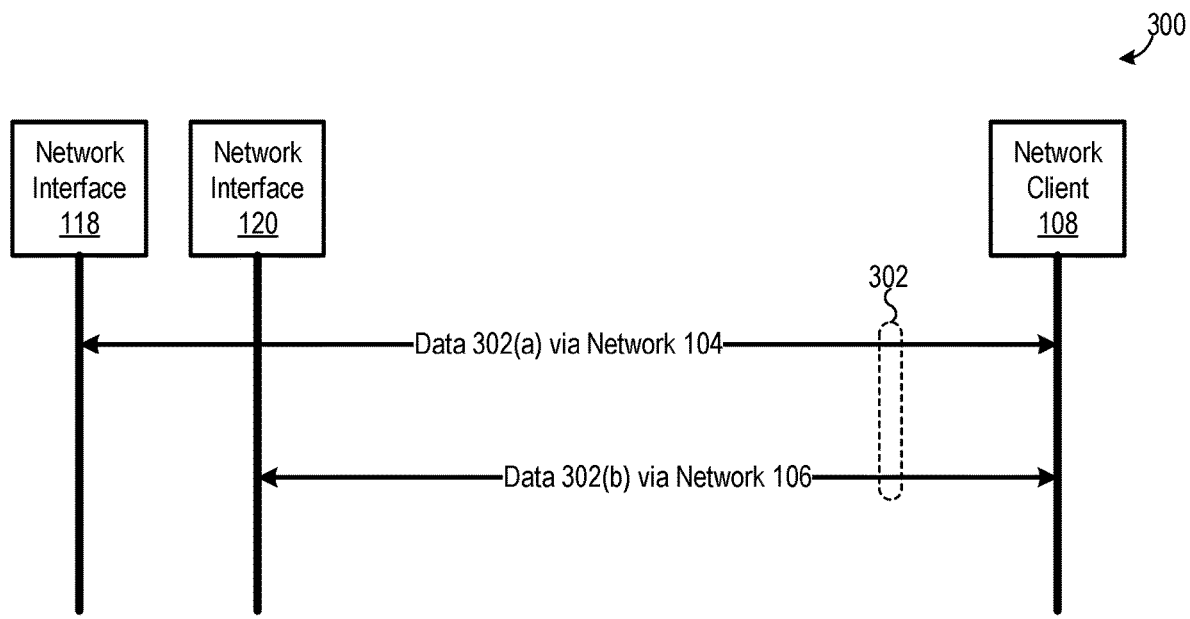
FIG. 3 is a dataflow diagram illustrating one example of how a CAIC of the FIG. 1 system could assign data to access communication networks.

FIG. 3 is a dataflow diagram 300 illustrating one example of how CAIC 116 could assign data 302 associated with network client 108 to one or more access communication networks. In this example, CAIC 116 assigns first and second portions 302(a) and 302(b) of data 302 to access communication networks 104 and 106, respectively, such that data 302 is switched, steered, or split among the two access communication networks. Consequently, portion 302(a) flows between network interface 118 and network client 108 via access communication network 104, and portion 302(b) flows between network interface 120 and network client 108 via access communication network 106. Accordingly, access communication networks 104 and 106 work together to serve network client 108, such that there is convergence of the two access communication networks. Portion 302(a) and portion 302(b) collectively form data 302, and a size of portion 302(a) need not be equal to a size of portion 302(b).

Figure 4:
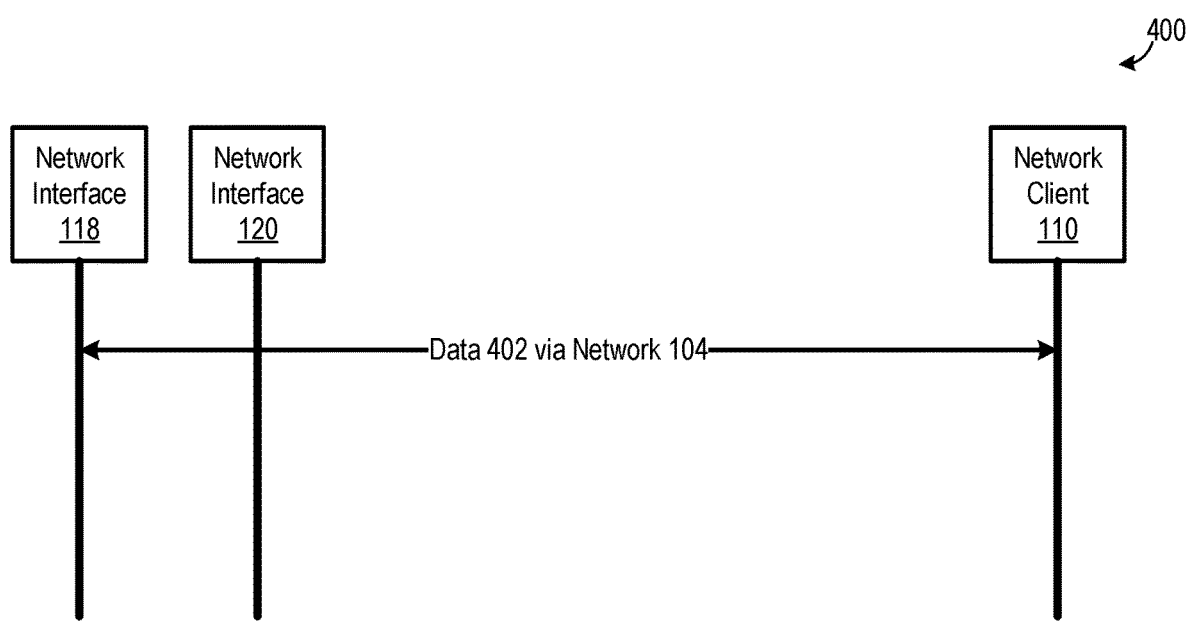
FIG. 4 is a dataflow diagram illustrating another example of how a CAIC of the FIG. 1 system could assign data to access communication networks.

FIG. 4 is a dataflow diagram 400 illustrating one example of how CAIC 116 could assign data 402 associated with network client 110 to one or more access communication networks. In this example, CAIC 116 assigns all data 402 to access communication network 104. Consequently, all data 402 flows between network interface 118 and network client 110. CAIC 116 assigns all data 402 to access communication network 104, for example, because the assignment achieves the best performance for network client 110, the assignment achieves a lowest data transmission cost, and/or because access communication network 106 is already highly utilized by other network clients.

Figure 5:
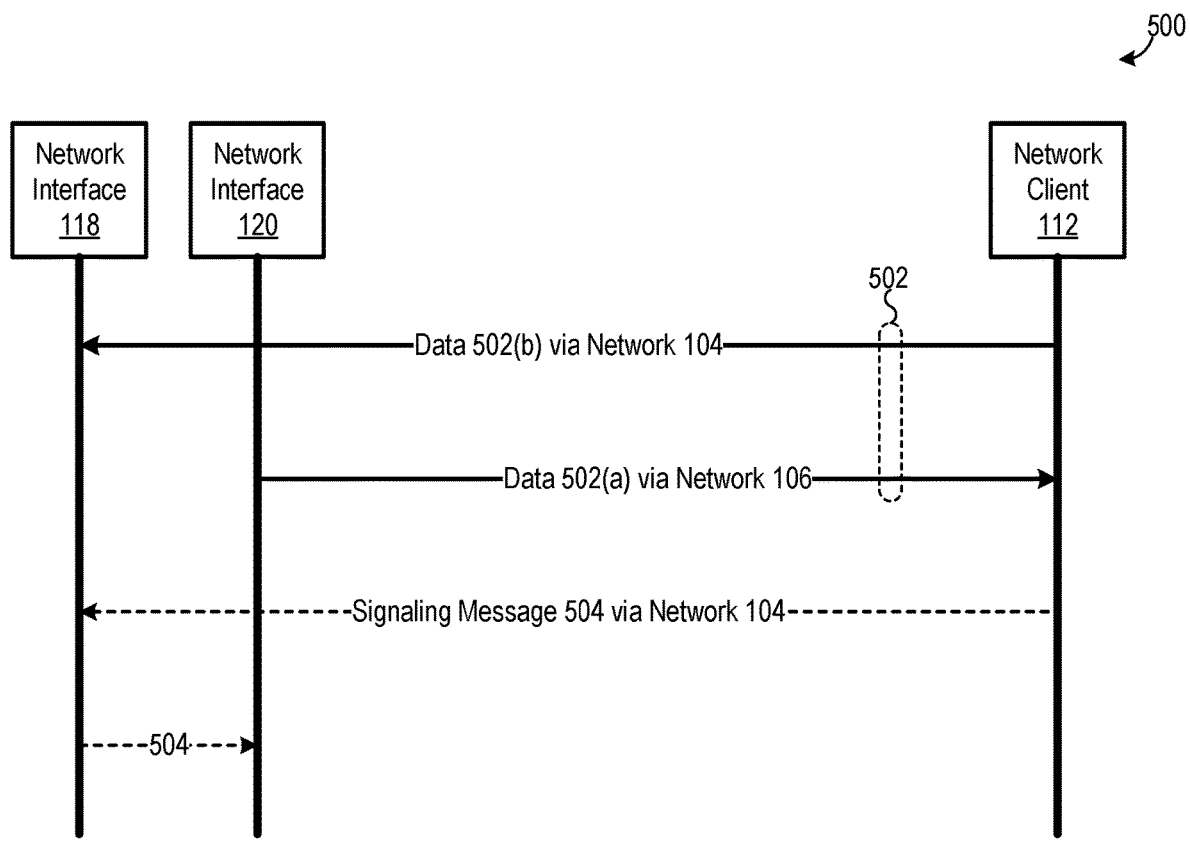
FIG. 5 is a dataflow diagram illustrating another example of how a CAIC of the FIG. 1 system could assign data to access communication networks.

FIG. 5 is a dataflow diagram 500 illustrating one example of how CAIC 116 could assign data 502 associated with network client 112 to one or more access communication networks. In this example, CAIC 116 assigns a downlink portion 502(a) of data 502 to access communication network 106, and CAIC 116 assigns an uplink portion 502(b) of data 502 to access communication network 104. Consequently, data 502 is switched, steered, or split among the two access communication networks such that (1) portion 502(a) flows from network interface 120 to network client 112 via access communication network 106 and (2) portion 502(b) flows from network client 112 to network interface 118 via access communication network 104. Accordingly, access communication networks 104 and 106 work together to serve network client 112, such that there is convergence of the two access communication networks.

As discussed above, access communication network 106 is only capable of providing downlink data transmission to network client 112. Consequently, any data transmission signaling messages that need to be transmitted from network client 112 to network interface 120 cannot be transmitted by access communication network 106. Accordingly, some embodiments of communication system 100 are advantageously configured such that data transmission signaling messages 504 from network client 112 to network interface 120 are transmitted via access communication network 104, as illustrated in FIG. 5. Data transmission signaling messages 504 include, for example, acknowledgement of receipt of data 502(a) by network client 112 and/or other wireless control plane signaling. Signaling message module 210 (not shown in FIG. 5) controls forwarding of data transmission signaling messages 504 from network interface 118 to network interface 120 at hub 102, such that access communication network 106 receives data transmission signaling messages 504. Some embodiments of signaling message module 210 remove data transmission protocol information associated with access communication network 104 from messages 504 before messages 504 are forwarded from network interface 118 to network interface 120.

Figure 6:
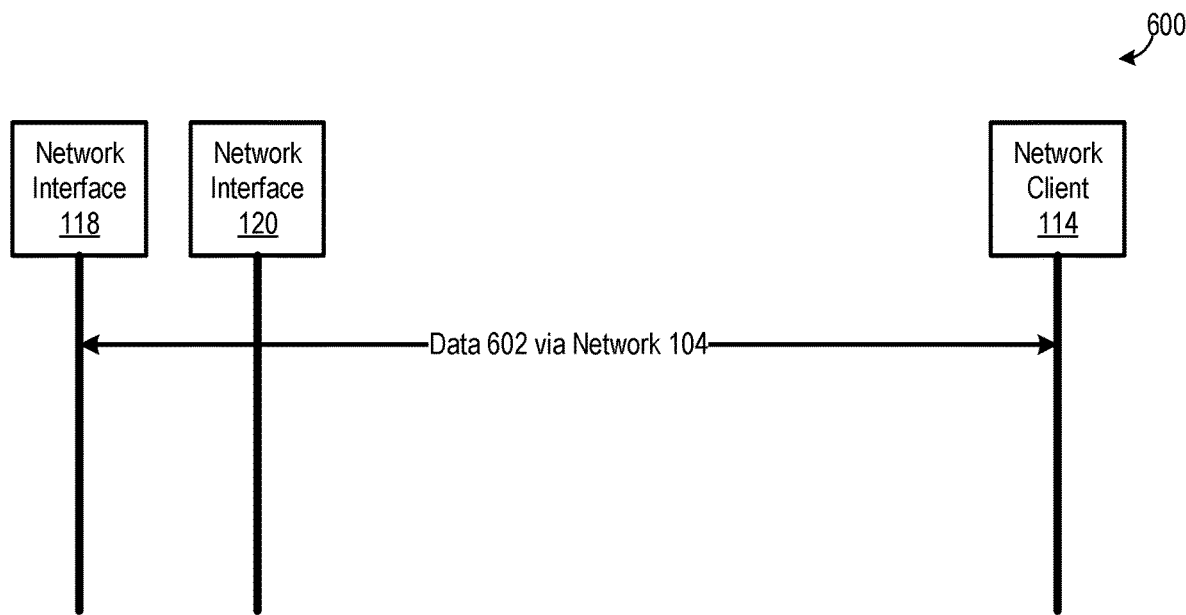
FIG. 6 is a dataflow diagram illustrating another example of how a CAIC of the FIG. 1 system could assign data to access communication networks.

FIG. 6 is a dataflow diagram 600 illustrating one example of how CAIC 116 could assign data 602 associated with network client 114 to one or more access communication networks. In this example, CAIC 116 assigns all data 602 to access communication network 104 because access communication network 104 is the only access communication network that serves network client 114. Consequently, all data 602 flows between network interface 118 and network client 114.

Discussed below with respect to FIGS. 7-14 are several example embodiments of communication system 100 of FIG. 1. It is understood, though, that communication system 100 is not limited to example embodiments of FIGS. 7-14.

Figure 7:
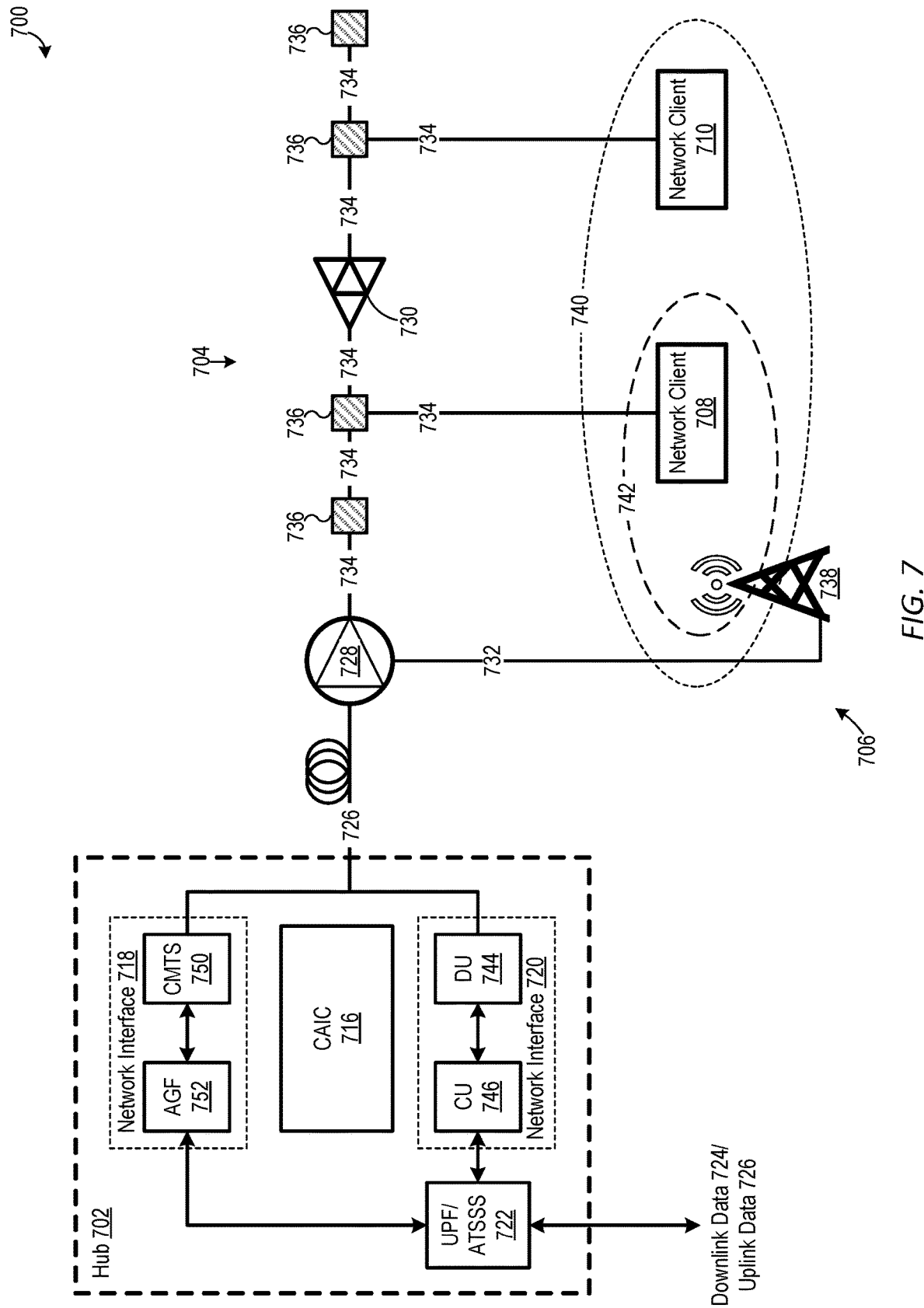
FIG. 7 is a block diagram of an embodiment of the FIG. 1 converged access communication system including a wireline access communication network and a wireless access communication network.

FIG. 7 is a block diagram of a converged access communication system 700, which is one embodiment of converged access communication system 100 of FIG. 1 including both a wireline access communication network and a wireless access communication network. Communication system 700 includes a hub 702, network clients 708 and 710, optical cables 726, a fiber node 728, an amplifier 730, optical cable 732, coaxial electrical cables 734, a plurality of taps 736, and a wireless base station 738. In certain deployments, optical cable 732 is instead an electrical cable. Optical cables 726 communicatively couple fiber node 728 to hub 702, and fiber node 728 communicatively couples optical cables 726 with each of optical cables 732 and coaxial electrical cables 734 connecting fiber nodes to amplifiers, amplifiers to the taps, and various taps. Accordingly, fiber node 728 translates communication signals between an optical domain and one or more electrical domains. Optical cable 732 communicatively couples wireless base station 738 with fiber node 728. In this example, wireless base station 738 includes a 5G radio unit (RU) (which is a portion of a 5G gNodeB), but wireless base station 738 could be another type of wireless base station without departing from the scope hereof. In some alternate embodiments, one or more of optical cables 726 directly connect wireless base station 738 with hub 702.

Each tap 736 provides a connection point to communicatively couple a respective network client to coaxial electrical cables 734. While not required, there would typically be a respective network client communicatively coupled to each tap 736. However, only two network clients, i.e., network clients 708 and 710, are shown in FIG. 7 for illustrative clarity. Amplifier 730 amplifies electrical signals on coaxial electrical cables 734. Optical cables 726, fiber node 728, amplifier 730, coaxial electrical cables 734, and taps 736 collectively form a first access communication network 704, which is hybrid fiber-cable (HFC) wireline access communication network. Optical cables 726, fiber node 728, optical cable 732, and wireless base station 738 collectively form a second access communication network 706, which is a cellular wireless access communication network. Access communication networks 704 and 706 may share optical cables 726 and fiber node 728. Each access communication network 704 and 706 can (and typically will) include additional elements which are not shown for illustrative clarity. For example, access communication network 704 may include additional fiber nodes 728, amplifiers 730, coaxial electrical cables 734, and taps 736, and access communication network 706 may include additional fiber nodes 728, optical cables 732, and wireless base stations 738.

Access communication network 704 is capable of serving all network clients, e.g., network clients 708 and 710, in its service area. Access communication network 706, however, provides more limited coverage. Specifically, wireless base station 738 has a downlink coverage area 740 that is larger than its uplink coverage area 742. Consequently, access communication network 706 can provide both uplink and downlink data transmission for network client 708, but access communication network 706 can provide solely downlink data transmission for network client 710.

Hub 702 is an embodiment of hub 102 of FIG. 1, and hub 702 includes a CAIC 716, a UPF/ATSSS module 722, a network interface 718, and a network interface 720. Connections between CAIC 716 and other elements of hub 702 are not shown for illustrative clarity. Network interface 718, which is an embodiment of network interface 118 of FIG. 1, provides access to access communication network 704. Network interface 718 includes a cable modem termination system (CMTS) 750 and an access gateway function (AGF) 752. AGF 752 is configured to converge wireline access communication network 704 with access communication network 706 via UPF/ATSSS module 722. Network interface 720, which is an embodiment of network interface 120 of FIG. 1, provides access to access communication network 706 at hub 702. Network interface 720 includes remaining elements of a 5G gNodeB, i.e. a radio access network distributed unit (DU) 744 and a radio access centralized unit (CU) 746. DU 744 provides support for lower protocol stack layers (e.g., a PHY layer, a medium access control (MAC) layer, and a radio link control (RLC) layer). CU 746 provides support for higher protocol stack layers (e.g., a radio resource control (RRC) layer, a packet data convergence protocol (PDCP) layer, and a service data adaption protocol (SDAP) layer).

UPF/ATSSS module 722 is an embodiment of data gateway 122 of FIG. 1. Accordingly, upon assignment of instructions from the CAIC 716, UPF/ATS SS module 722 steers, switches, and/or splits a downlink data stream 724 among access communication networks 704 and 706 via respective network interfaces 718 and 720. UPF/ATSSS 722 further combines uplink data from access communication networks 704 and 706 into a single uplink data stream 726.

Figure 8:
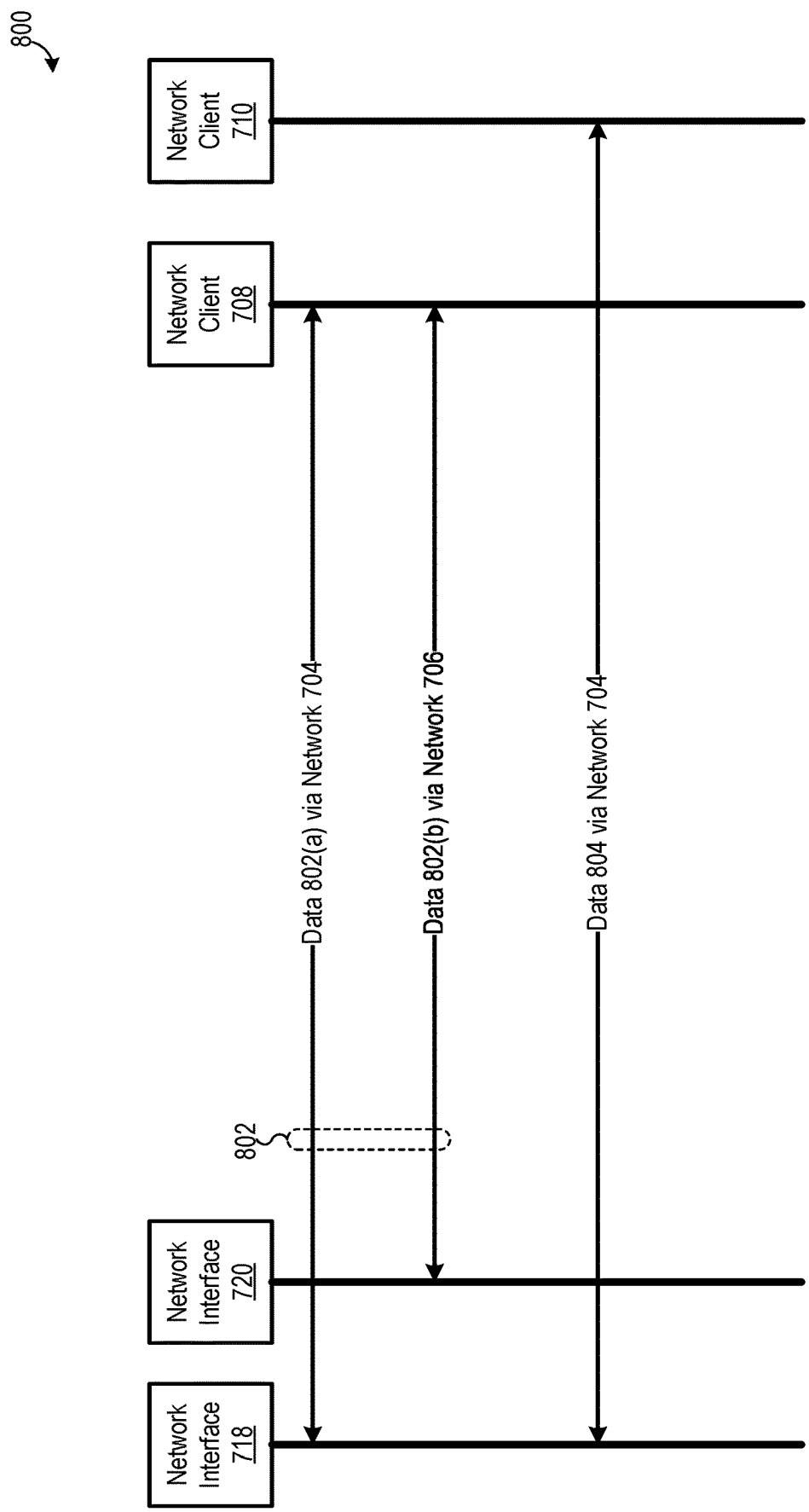
FIG. 8 is a dataflow diagram illustrating one example of how a CAIC of the FIG. 7 system could assign data to access communication networks.
Figure 9:
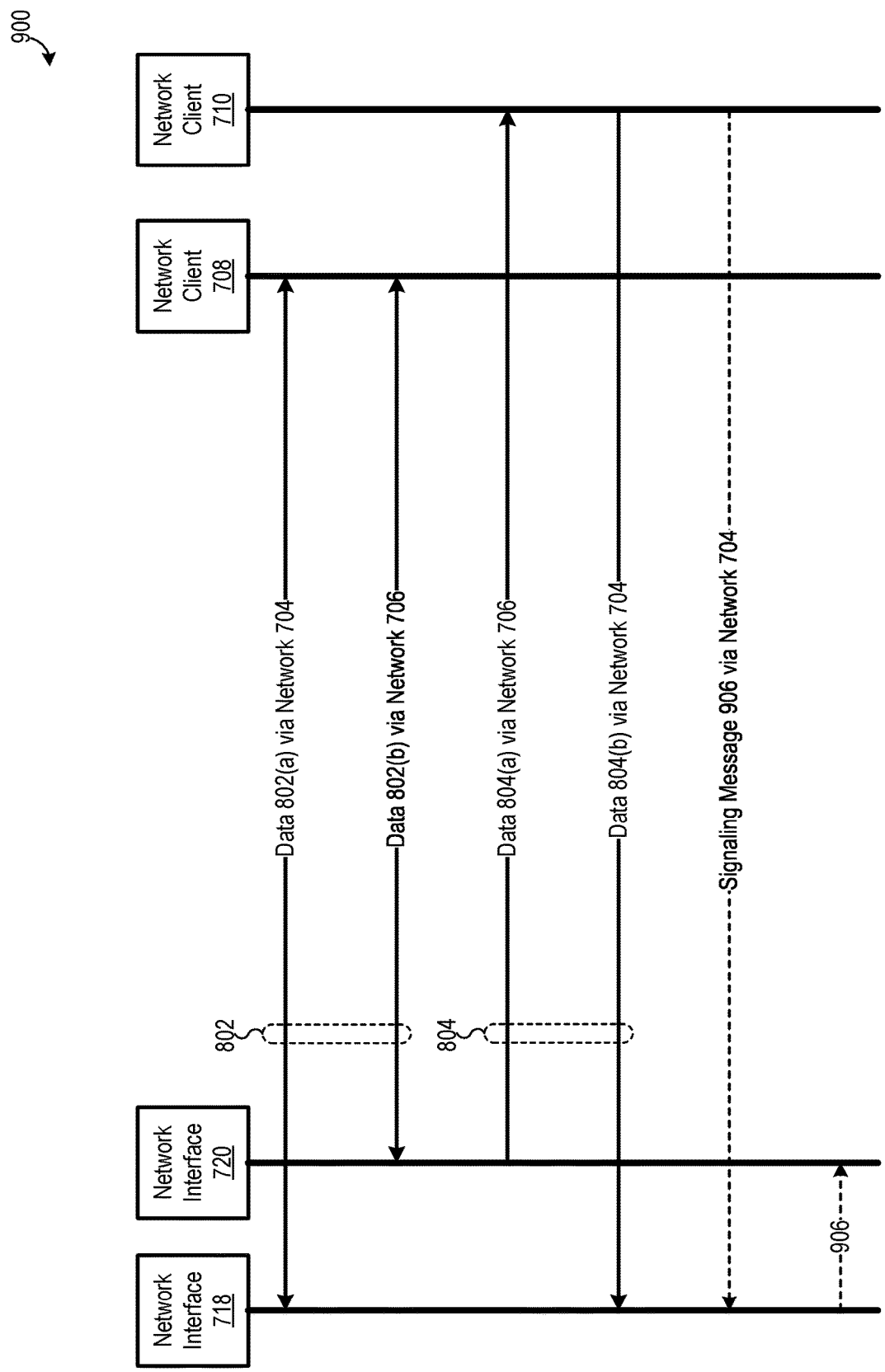
FIG. 9 is a dataflow diagram illustrating another example of how a CAIC of the FIG. 7 system could assign data to access communication networks.

CAIC 716 is an embodiment of CAIC 116 of FIG. 1. Accordingly, CAIC 716 is configured to assign data flowing between client devices 708 and 710 and hub 702 to access communication networks 704 and 706 in a manner analogous to that discussed above with respect to CAIC 116 and provide the assignment instructions to UPF/ATSSS 722. Discussed below with respect to FIGS. 8 and 9 are examples of how CAIC 716 could assign data to access communication networks 704 and 706. It is understood, though, that CAIC 716 is not limited to operating according to these examples.

FIG. 8 is a dataflow diagram 800 illustrating one example of how CAIC 716 could assign data 802 associated with network client 708 and data 804 associated with network client 710 to one or more access communication networks. In this example, CAIC 716 assigns first and second portions 802(*a*) and 802(*b*) of data 802 to access communication networks 704 and 706, respectively, such that data 802 is switched, steered, or split among the two access communication networks. Consequently, portion 802(*a*) flows between network interface 718 and network client 708 via access communication network 704, and portion 802(*b*) flows between network interface 720 and network client 708 via access communication network 706. Portion 802(*a*) and portion 802(*b*) collectively form data 802, and a size of portion 802(*a*) need not be equal to a size of portion 802(*b*). CAIC 716 additionally assigns data 804 solely to access communication network 704, possibly because access communication network 706 cannot provide uplink data transmission for network client 710. Consequently, data 804 flows between network interface 718 and network client 710 via access communication network 704.

FIG. 9 is a dataflow diagram 800 illustrating another example of how CAIC 716 could assign data 802 associated with network client 708 and data 804 associated with network client 710 to one or more access communication networks. In this example, CAIC 716 assigns first and second portions 802(*a*) and 802(*b*) of data 802 to access communication networks 704 and 706, respectively, in the same manner as in the FIG. 8 example. However, CAIC 716 handles data 804 differently. Specifically, CAIC 716 assigns a downlink portion 804(*a*) of data 804 to access communication network 706, and CAIC 716 assigns an uplink portion 804(*b*) of data 804 to access communication network 704. Consequently, downlink portion 804(*a*) flows from network interface 720 to network client 710 via access communication network 706, and uplink portion 804(*b*) flows from network client 710 to network interface 718 via access communication network 704.

Additionally, as discussed above, access communication network 706 is only capable of providing downlink data transmission to network client 710. Consequently, any data transmission signaling messages that need to be transmitted from network client 710 to network interface 720 cannot be transmitted by access communication network 706. Accordingly, some embodiments of communication system 700 are advantageously configured such that data transmission signaling messages 906 from network client 710 to network interface 720 are transmitted via access communication network 704, as illustrated in FIG. 9. Data transmission signaling messages 906 include, for example, acknowledgement of receipt of data 804(*a*) by network client 710 and/or other wireless control plane signaling. CAIC 716 controls forwarding of data transmission signaling messages 906 from network interface 718 to network interface 720 at hub 702, such that access communication network 706 receives data transmission signaling messages 906. Some embodiments of CAIC 716 remove data transmission protocol information associated with access communication network 704 from messages 906 before messages 906 are forwarded from network interface 718 to network interface 720.

Figure 10:
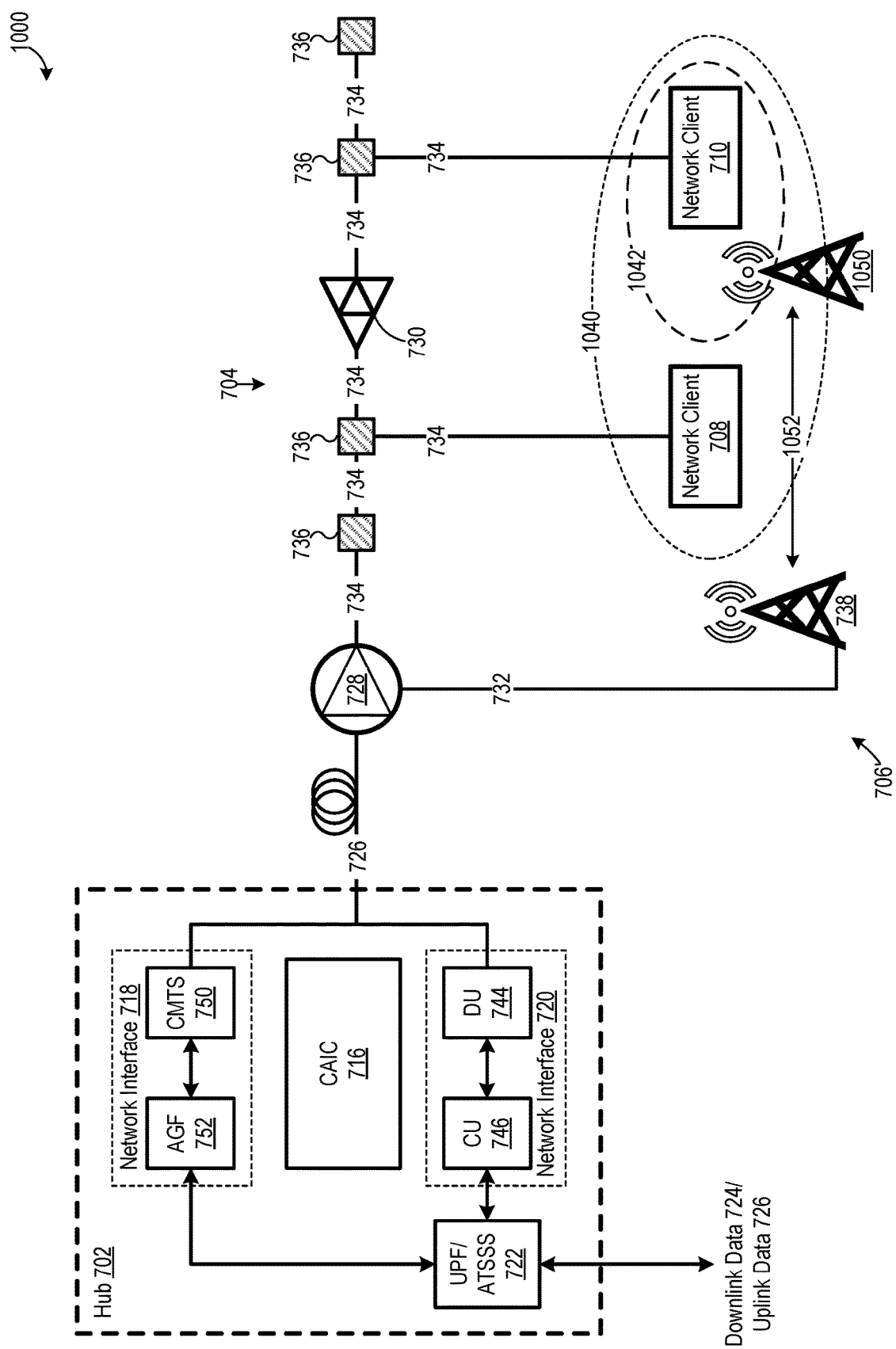
FIG. 10 is a block diagram of an alternate embodiment of the FIG. 7 system including an additional wireless base station.

FIG. 10 is a block diagram of a converged access communication system 1000, which is an alternate embodiment of converged access communication system 700 of FIG. 7 further including a wireless base station 1050. Wireless base station 1050 is configured to extend the range of wireless base station 738. Accordingly, wireless base station 1050 functions as a repeater. The access communication network including optical cables 726, fiber node 728, optical cable 732, wireless base station 738, and wireless base station 1050 is designated as access communication network 706' in FIG. 10. Wireless base station 1050 is communicatively coupled with wireless base station 738, for example, via a wireless backhaul link 1052, e.g., operating at 6 Gigahertz (GHz) or 60 GHz. Some embodiments of wireless base station 1050 include a radio unit (RU) plus a distributed unit (DU). Wireless base station 1050 has a downlink coverage area 1040 and an uplink coverage area 1042. Consequently, access communication network 706' is capable of providing both uplink and downlink data transmission to network client 710 as well as to network client 708. Coverage area of wireless base station 738 is not shown in FIG. 10, but coverage area of wireless base station 738 is the same as illustrated in FIG. 7.

Figure 11:
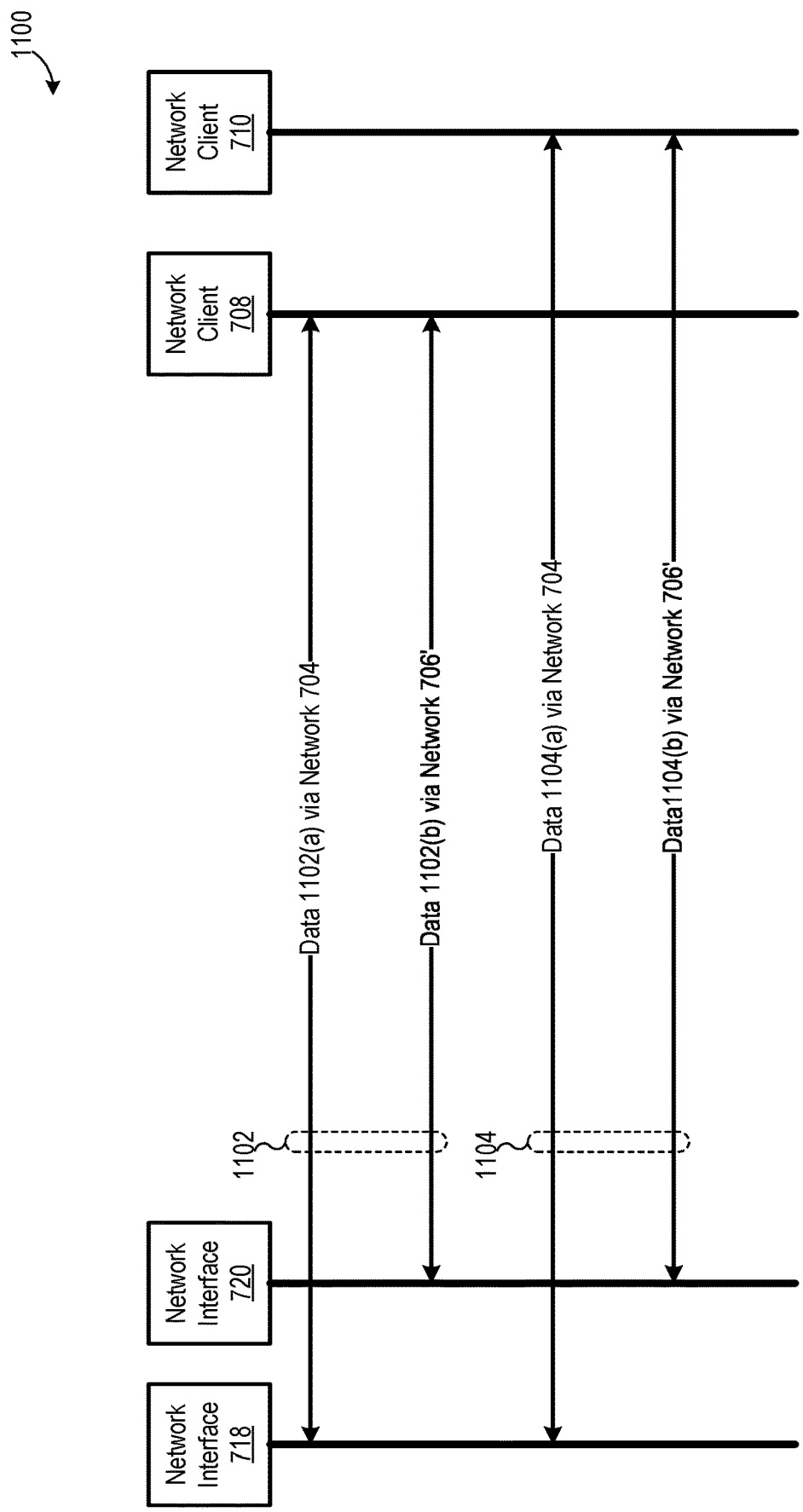
FIG. 11 is a dataflow diagram illustrating one example of how a CAIC of the FIG. 10 system could assign data to access communication networks.

FIG. 11 is a dataflow diagram 1100 illustrating an example of how CAIC 716 could assign data 1102 associated with network client 708 and data 1104 associated with network client 710 to one or more access communication networks of the FIG. 10 system. In this example, CAIC 716 assigns first and second portions 1102(*a*) and 1102(*b*) of data 1102 to access communication networks 704 and 706', such that data 1102 is switched, steered, or split among the two access communication networks. Consequently, portion 1102(*a*) flows between network interface 718 and network client 708 via access communication network 704, and portion 1102(*b*) flows between network interface 720 and network client 708 via access communication network 706'. Portion 1102(*a*) and portion 1102(*b*) collectively form data 1102, and a size of portion 1102(*a*) need not be equal to a size of portion 1102(*b*).

Additionally, CAIC 716 handles data 1104 in a manner analogous to data 1102, in the FIG. 11 example. Specifically, CAIC 716 assigns first and second portions 1104(*a*) and 1104(*b*) of data 1104 to access communication networks 704 and 706', such that data 1104 is switched, steered, or split among the two access communication networks. Consequently, portion 1104(*a*) flows between network interface 718 and network client 710 via access communication network 704, and portion 1104(*b*) flows between network interface 720 and network client 710 via access communication network 706'. Portion 1104(*a*) and portion 1104(*b*) collectively form data 1104, and a size of portion 1104(*a*) need not be equal to a size of portion 1104(*b*).

Converged access communication systems 700 and 1000 could be modified without departing from the scope hereof. For example, access communication network 704 could be an optical wireline access communication network, a DSL access communication network, or a powerline wireline access communication network, instead of a HFC wireline access communication network, with appropriate changes to network interface 718. As another example, access communication network 706 could be a 6G cellular wireless access communication network, a LTE cellular wireless access communication network, a CBRS wireless communication network, a WiFi wireless access communication network, a Bluetooth wireless access communication network, a Satellite wireless access communication network, a LoRa wireless access communication network, or a Zigbee wireless access communication network, instead of a 5G cellular wireless access communication network, with appropriate changes to network interface 720. As another example, each of access communication networks 704 and 706 could be a wireline access communication network, or each of access communication networks 704 and 706 could be a wireless access communication network. As another example, either of communication systems 700 and 1000 could be modified to include one or more additional access communication networks.

Figure 12:
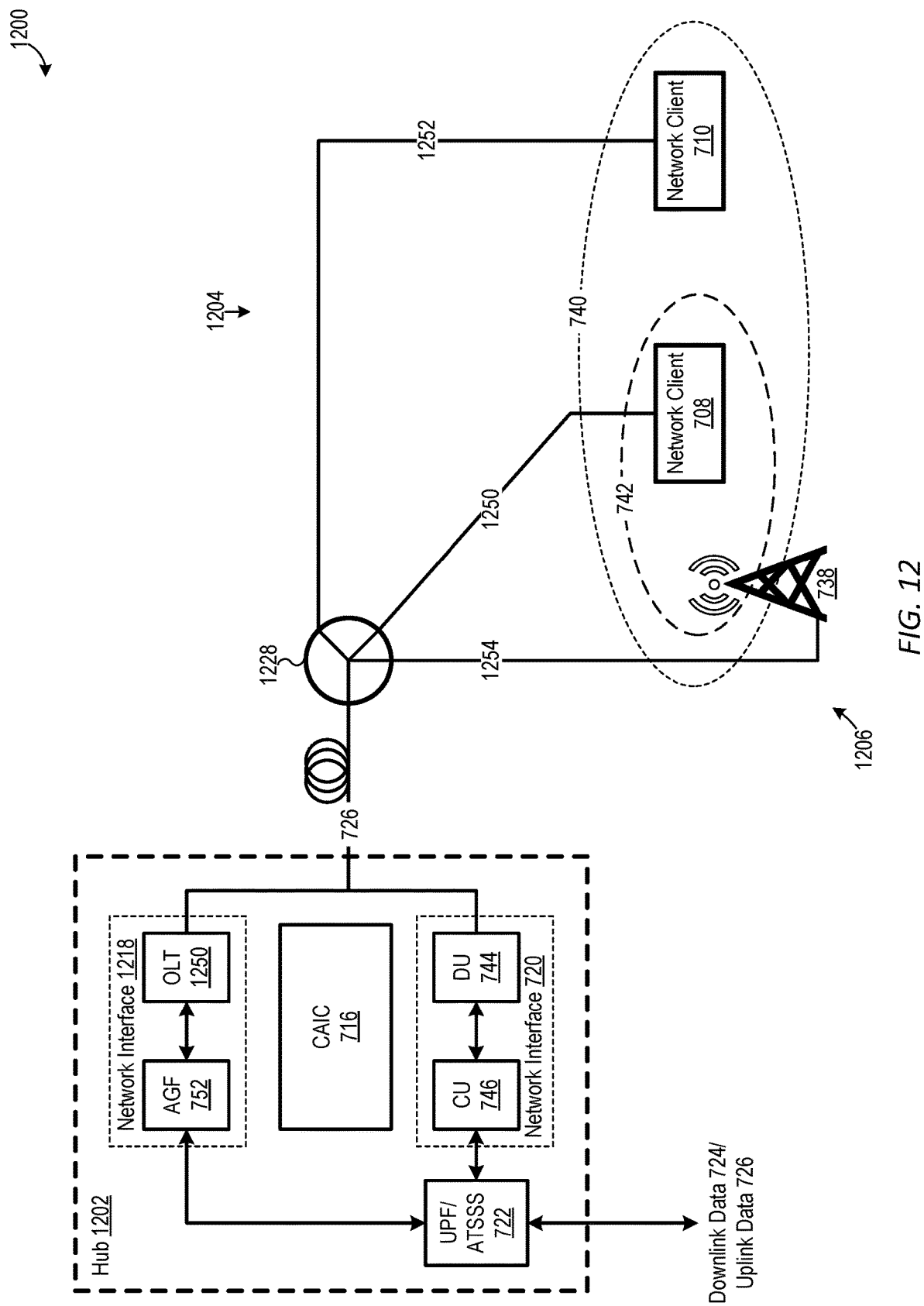
FIG. 12 is a block diagram of an alternate embodiment of the FIG. 7 system where electrical cable is replaced with optical cable.

For instance, FIG. 12 is a block diagram of a converged access communication system 1200, which is an alternate embodiment of converged access communication system 700 of FIG. 7 where electrical cable is replaced with optical cable. System 1200 forms first and second access communication networks 1204 and 1206, respectively. First access communication network 1204 is formed by optical cable 726, an optical splitter 1228, optical cable 1250, and optical cable 1252. Some embodiments of access communication network 1204 operate according to an EPON, RFOG, or GPON data transmission protocol. Second access communication network 1206 is formed of optical cable 726, optical splitter 1228, optical cable 1254, and wireless base station 738, and second access communication network 1206 is a 5G access communication network.

System 1200 includes a hub 1202 in place of hub 702, where the two hubs differ in that hub 1202 includes a network interface 1218 in place of network interface 718. Network interface 1218 includes an OLT 1250 in place of CMTS 750. CAIC 716 is configured to assign data flowing between client devices 708 and 710 and hub 1202 to access communication networks 1204 and 1206 in a manner analogous to that discussed above with respect to CAIC 116.

Figure 13:
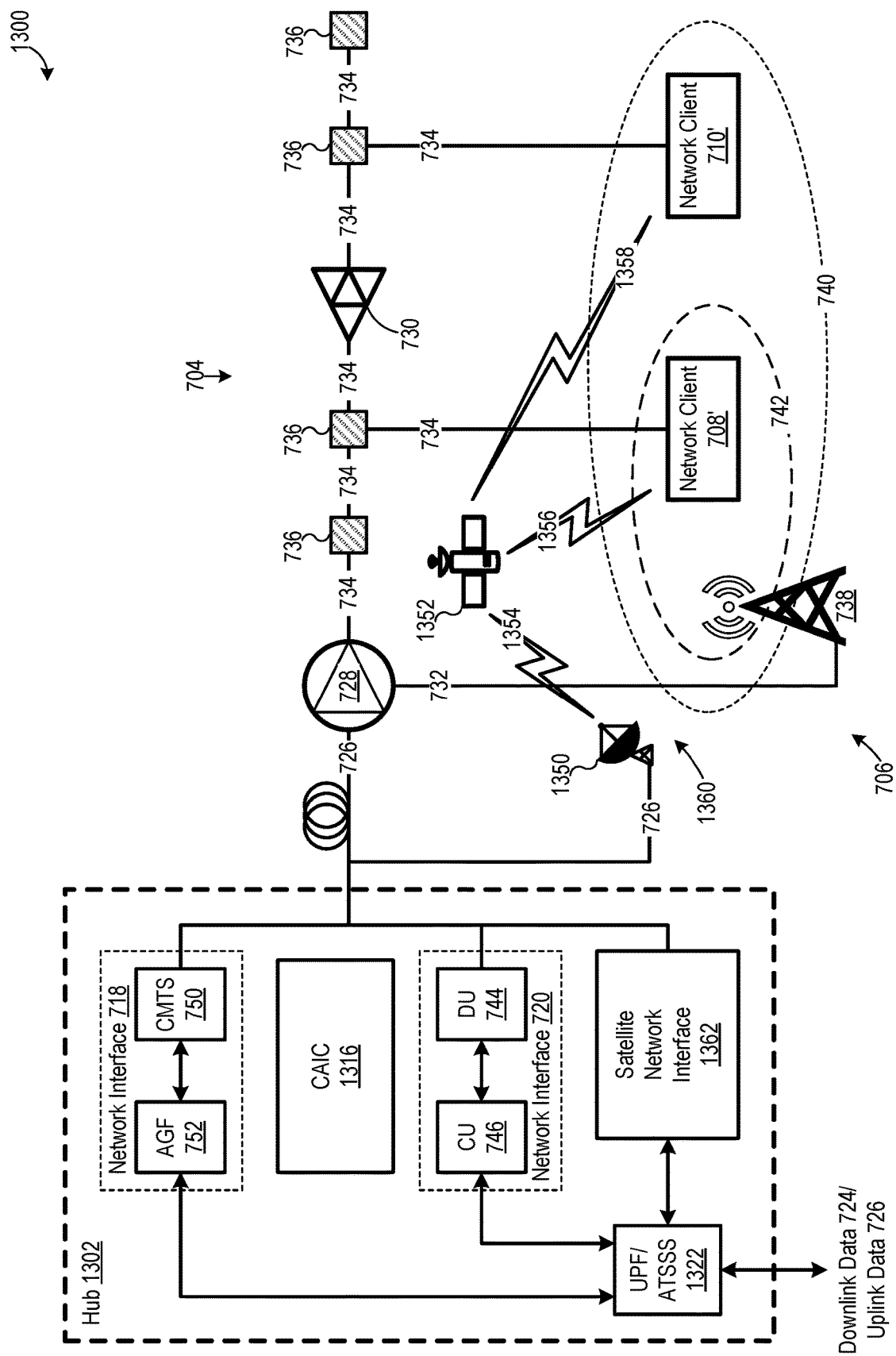
FIG. 13 is a block diagram of an alternate embodiment of the FIG. 7 system including an additional access communication network.

As another example, FIG. 13 is a block diagram of a converged access communication system 1300, which is an alternate embodiment of converged access communication system 700 of FIG. 7 including three access communication networks. Communication system 1300 further include a satellite ground station 1350 and a satellite 1352, along with the elements of access communication networks 704 and 706. Communication system 1300 additionally includes a hub 1302 in place of hub 702. Satellite ground station 1350 is communicatively coupled to hub 1302 via one or more of optical cables 726, and satellite ground station 1350 communicates with satellite 1352 via wireless communication signals 1354. Satellite 1352 communicates with networks clients 708' and 710' via wireless communication signals 1356 and 1358, respectively. Network clients 708' and 710' are the same as network clients 708 and 710 of FIG. 7, except that network clients 708' and 710' are further capable of connecting to a satellite access communication network. Optical cables 726, satellite ground station 1350, and satellite 1352 collectively form a third access communication network 1360 capable of serving each of network clients 708' and 710'.

Hub 1302 is the same as hub 702 except that (1) CAIC 716 is replaced with a CAIC 1316, (2) UPF/ATSSS module 722 is replaced with a UPF/ATSSS module 1322, and (3) hub 1302 further includes a satellite network interface 1362. Network interface 1362 provides access to access communication network 1360. UPF/ATSSS module 1322 is like UPF/ATSSS module 722, but UPF/ATSSS module 1322 steers, switches, and/or splits downlink data stream 724 among access communication networks 704, 706, and 1360 via respective network interfaces 718, 720, and 1362, in response to assignment instructions from CAIC 1316. UPF/ATSSS 1322 further combines uplink data from access communication networks 704, 706, and 1360 into single uplink data stream 726.

Figure 14:
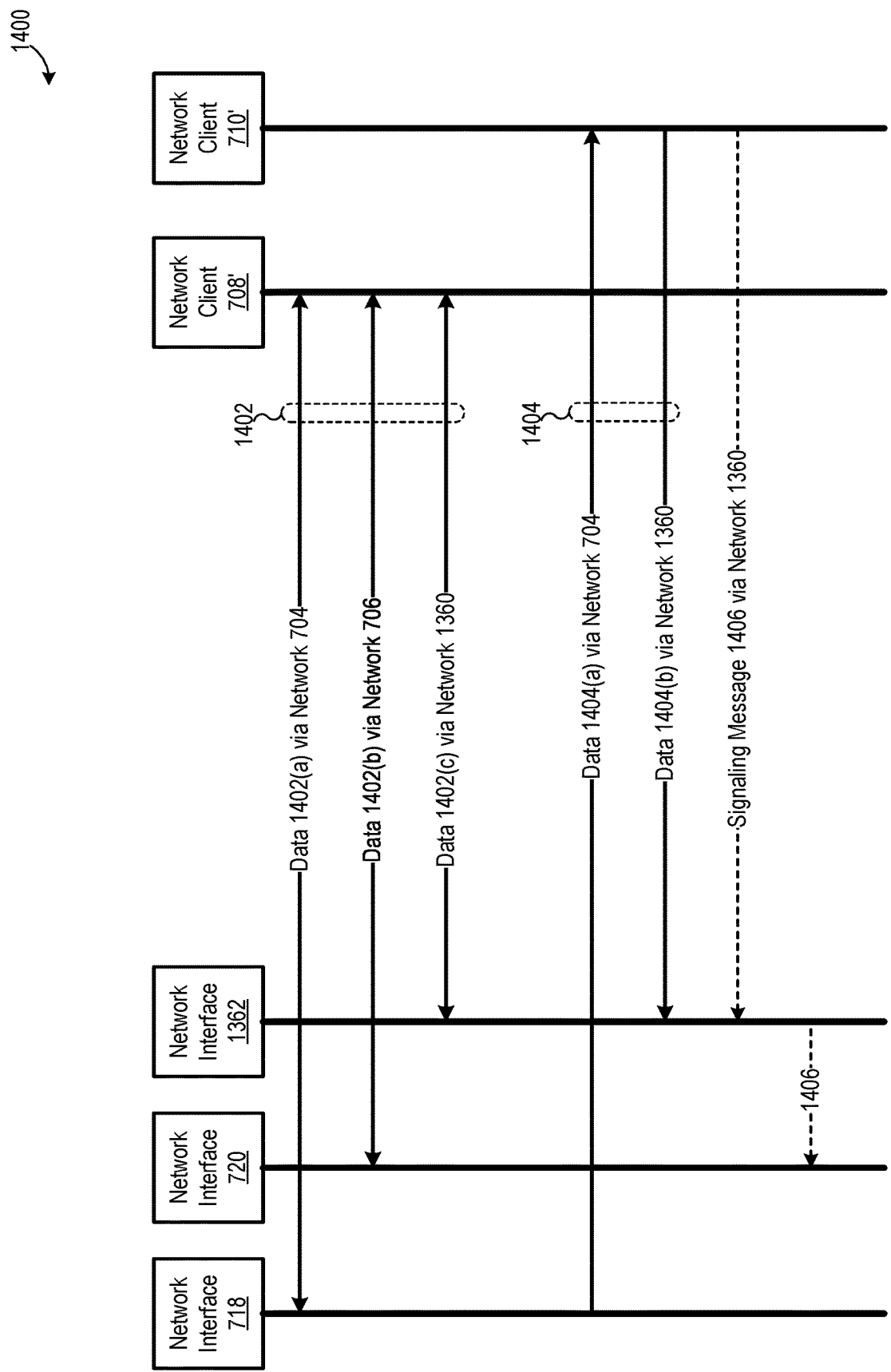
FIG. 14 is a dataflow diagram illustrating one example of how a CAIC of the FIG. 13 system could assign data to access communication networks.

CAIC 1316 is an embodiment of CAIC 116 of FIG. 1. Accordingly, CAIC 1316 is configured to assign data flowing between client devices 708' and 710' and hub 1302 to access communication networks 704, 706, and 1360 in a manner analogous to that discussed above with respect to CAIC 116 and provide the assignment instructions to UPF/ATSSS 1322. Discussed below with respect to FIG. 14 is one example of how CAIC 1316 could assign data to access communication networks 704, 706, and 1360. It is understood, though, that CAIC 1316 is not limited to operating according to this example.

FIG. 14 is a dataflow diagram 1400 illustrating one example of how CAIC 1316 could assign data 1402 associated with network client 708' and data 1404 associated with network client 710' to one or more access communication networks. In this example, CAIC 1316 assigns first, second, and third portions 1402(a), 1402(b), and 1402(c) of data 1402 to access communication networks 704, 706, and 1360, respectively, such that data 1402 is switched, steered, or split among the three access communication networks. Consequently, portion 1402(a) flows between network interface 718 and network client 708' via access communication network 704, portion 1402(b) flows between network interface 720 and network client 708' via access communication network 706, and portion 1402(c) flows between network interface 1362 and network client 708' via access communication network 1360. Portion 1402(a), portion 1402(b), and portion 1402(c) collectively form data 1402, and portions 1402(a), 1402(b), and 1402(c) need not be of equal to a size.

Additionally, CAIC 1316 assigns a downlink portion 1404(a) of data 1404 to access communication network 706, and CAIC 1316 assigns an uplink portion 1404(b) of data 1404 to access communication network 1360. Consequently, downlink portion 1404(a) flows from network interface 720 to network client 710' via access communication network 706, and uplink portion 1404(b) flows from network client 710' to network interface 1362 via access communication network 1360.

Furthermore, access communication network 706 is only capable of providing downlink data transmission to network client 710'. Consequently, any data transmission signaling messages that need to be transmitted from network client 710' to network interface 720 cannot be transmitted by access communication network 706. Accordingly, some embodiments of communication system 1300 are advantageously configured such that data transmission signaling messages 1406 from network client 710' to network interface 720 are transmitted via access communication network 1360, as illustrated in FIG. 14. Data transmission signaling messages 1406 include, for example, acknowledgement of receipt of data 1404(a) by network client 710' and/or other wireless control plane signaling. CAIC 1316 controls forwarding of data transmission signaling messages 1406 from network interface 1362 to network interface 720 at hub 1302, such that access communication network 706 receives data transmission signaling messages 1406. Some embodiments of CAIC 1316 remove data transmission protocol information associated with access communication network 1360 from messages 1406 before messages 1406 are forwarded from network interface 1362 to network interface 720. In some alternate embodiments, data transmission signaling messages 1406 are transmitted from network client 710' to hub 1302 via access communication network 704 instead of via access communication network 1360.

Combinations of Features

Features described above may be combined in various ways without departing from the scope hereof. The following examples illustrate some possible combinations.

(A1) A method for access communication network convergence includes (1) obtaining subscription policy information associated with a network client capable of being served by a plurality of access communication networks, (2) obtaining network characteristics representing operating state of each of the plurality of access communication networks, and (3) assigning data flowing between the network client and a hub to one or more of the plurality of access communication networks at least partially based on the subscription policy information and the network characteristics.

(A2) In the method denoted as (A1), the plurality of access communication networks may include a wireless access communication network and a wireline access communication network.

(A3) In the method denoted as (A1), assigning the data flowing between the network client and the hub to one or more of the plurality of access communication networks may include (1) assigning downlink data to a first access communication network of the plurality of access communication networks and (2) assigning uplink data to a second access network of the plurality of access communication networks.

(A4) In the method denoted as (A3), the first access communication network may be a wireless communication network, and the second access communication network may be a wireline communication network.

(A5) The method denoted as (A4) may further include transmitting wireless data transmission signaling messages from the network client to the wireless communication network via the wireline communication network.

(A6) In the method denoted as (A5), the wireless data transmission signaling messages may include messages from the network client acknowledging receipt of data from the wireless communication network.

(A7) In the method denoted as (A5), the wireless data transmission signaling messages may include wireless control plane signaling.

(A8) Any one of the messages denoted as (A5) through (A7) may further include removing wireline data transmission protocol information from the wireless data transmission signaling messages after transmitting the wireless data transmission signaling messages from the network client to the wireless communication network via the wireline communication network.

(A9) In the method denoted as (A3), the first access communication network may be a wireline communication network, the second access communication network may be a wireless communication network.

(A10) The method denoted as (A9) may further include transmitting wireline data transmission signaling messages from the network client to the wireline communication network via the wireless communication network.

(A11) In the method denoted as (A10), the wireline data transmission signaling messages may include messages from the network client acknowledging receipt of data from the wireline communication network.

(A12) Any one of the messages denoted as (A10) and (A11) may further include removing wireless data transmission protocol information from the wireline data transmission signaling messages after transmitting the wireline data transmission signaling messages from the network client to the wireline communication network via the wireless communication network.

(A13) In any one of the methods denoted as (A1) through (A12), the network characteristics may include utilization of each of the plurality of access communication networks.

(A14) In any one of the methods denoted as (A1) through (A13), the network characteristics may include forecasted traffic demand of one or more of (a) the plurality of access communication networks and (b) one or more clients served by the plurality of access communication networks.

(A15) In the method denoted as (A14), the forecasted traffic demand may be generated using one or more artificial intelligence techniques.

(A16) In any one of the methods denoted as (A1) through (A15), the subscription policy information may include communication network bandwidth provisioned to the network client.

(A17) In the method denoted as (A1), (1) the data flowing between the network client and the hub may include a first data flow and a second data flow, and (2) assigning the data flowing between the network client and the hub to one or more of the plurality of access communication networks may include (a) assigning the first data flow to a first access communication network of the plurality of access communication networks and (b) assigning the second data flow to a second access communication network of the plurality of access communication networks (A18) In the method denoted as (A17), the first access communication network may be a wireless access communication network, and the second access communication network is a wireline access communication network.

(A19) In the method denoted as (A17), the first access communication network may be a first wireless access communication network, and the second access communication network may be a second wireless access communication network.

(A20) Any one of the methods denoted as (A1) through (A19) may further include assigning data flowing between the network client and the hub to one or more of the plurality of access communication networks at least partially based on the subscription policy information, the network characteristics, and capabilities of the network client.

(B1) A converged access intelligent controller includes (1) a subscription policy module configured to obtain subscription policy information associated with a network client capable of being served by a plurality of access communication networks, (2) a network characteristics module configured to obtain network characteristics representing operating state of each of the plurality of access communication networks, and (3) an allocation module configured to assign data flowing between the network client and a hub to one or more of the plurality of access communication networks at least partially based on the subscription policy information and the network characteristics.

(B2) In the converged access intelligent controller denoted as (B1), the plurality of access communication networks may include a wireless access communication network and a wireline access communication network.

(B3) Any one of the converged access intelligent controllers denoted as (B1) and (B2) may further include a signaling message module configured to control forwarding of wireless data transmission signaling messages transmitted to the hub by the wireline access communication network to the wireless access communication network.

(B4) In the converged access intelligent controller denoted (B3), the signaling message module may be further configured to remove wireline data transmission protocol information from the wireless data transmission signaling messages before forwarding the wireless data transmission signaling messages to the wireless access communication network.

(B5) Any one of the converged access intelligent controllers denoted as (B1) through (B4) may further include a client capability module configured to obtain capabilities of the network client, wherein the allocation module is further configured to assign data flowing between the network client and the hub to one or more of the plurality of access communication networks at least partially based on the subscription policy information, capabilities of the network client, and the network characteristics.

(B6) In any one of the converged access intelligent controllers denoted as (B1) through (B5), the network characteristics may include utilization of each of the plurality of access communication networks, and the subscription policy information may include one or more of (a) communication network bandwidth provisioned to the network client, (b) access traffic steering, (c) switching and/or splitting restrictions, (d) maximum data transfer latency specifications, (e) time of day and/or day of week use restrictions, (f) priority information, (g) geographic use restrictions, and (h) data type restrictions.

(B7) Any one of the converged access controllers denoted as (B1) through (B6) may further include an application programming interface for customization of the converged access controller.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for access communication network convergence, the method comprising:
    at a hub, obtaining subscription policy information associated with a first network client capable of being served by a plurality of access communication networks, wherein the first network client is at a location downstream of the hub;
    at the hub, exchanging data with at least the first network client via at least one of the plurality of access communication networks, wherein the hub is a point of presence for one or more operators of the plurality of access communication networks;
    at the hub, obtaining network characteristics representing one or more of a) utilization of one or more of the plurality of access communication networks, (ii) forecasted traffic demand of one or more of the plurality of access communication networks, and (iii) forecasted traffic demand of one or more clients served by the plurality of access communication networks;
    at the hub, assigning data flowing between the first network client and the hub to one or more of the plurality of access communication networks based on the subscription policy information and the network characteristics;
    at the hub, controlling one or more of a plurality of network interfaces of the hub, wherein each network interface of the hub provides an interface to a respective one of the plurality of access communication networks;
    at the hub, controlling forwarding of wireless data transmission signaling messages transmitted to the hub by a wireline access communication network of the plurality of access communication networks to a wireless access communication network of the plurality of access communication networks; and
    at the hub, removing wireline data transmission protocol information from the wireless data transmission signaling messages before forwarding the wireless data transmission signaling messages to the wireless access communication network.

2. The method of claim 1, further comprising, at the hub, assigning the data flowing between the first network client and the hub to one or more of the plurality of access communication networks at least partially on the basis of direction of the data flowing between the first network client and the hub.

3. The method of claim 1, wherein the wireless data transmission signaling messages comprise messages from the first network client acknowledging receipt of data from the wireless access communication network.

4. The method of claim 1, wherein the wireless data transmission signaling messages comprise wireless control plane signaling.

5. The method of claim 1, wherein at least one of the forecasted traffic demand of the one or more of the plurality of access communication networks and the forecasted traffic demand of the one or more clients served by the plurality of access communication networks is generated using one or more artificial intelligence techniques.

6. The method of claim 1, wherein the subscription policy information comprises communication network bandwidth provisioned to the first network client.

7. The method of claim 1, wherein:
the data flowing between the first network client and the hub comprises a first data flow and a second data flow; and
assigning the data flowing between the first network client and the hub to one or more of the plurality of access communication networks comprises assigning the data flowing between the first network client and the hub to one or more of the plurality of access communication networks at least partially on the basis of whether the data is part of the first data flow or the second data flow.

8. The method of claim 7, wherein:
the first access communication network is a wireless access communication network; and
the second access communication network is a wireline access communication network.

9. The method of claim 7, wherein:
the first access communication network is a first wireless access communication network; and
the second access communication network is a second wireless access communication network.

10. The method of claim 1, further comprising, at the hub, assigning data flowing between the first network client and the hub to one or more of the plurality of access communication networks at least partially based on the subscription policy information, the network characteristics, and capabilities of the network client.

11. A hub of a converged access communication system, comprising:
a plurality of network interfaces, wherein each network interface is configured to provide an interface to a respective access communication network of a plurality of access communication networks at a point of presence for one or more operators of the plurality of access communication networks, to enable the hub to exchange data with at least a first network client that is at a location downstream of the hub via each of the plurality of access communication networks; and
a converged access intelligent controller including electronic circuitry configured to:
obtain subscription policy information associated with at least the first network client,
obtain network characteristics representing at least one of (i) utilization each one or more of the plurality of access communication networks, (ii) forecasted traffic demand of one or more of the plurality of access communication networks, and (iii) forecasted traffic demand of one or more clients served by the plurality of access communication networks, and
assign data flowing between the first network client and the hub to one or more of the plurality of access communication networks based on the subscription policy information and the network characteristics,
control one or more of the plurality of network interfaces of the hub,
control forwarding of wireless data transmission signaling messages transmitted to the hub by a wireline access communication network of the plurality of access communication networks to a wireless access communication network of the plurality of access communication networks, and
remove wireline data transmission protocol information from the wireless data transmission signaling messages before forwarding the wireless data transmission signaling messages to the wireless access communication network.

12. The hub of claim 11, wherein the electronic circuitry of the converged access intelligent controller is further configured to (i) obtain capabilities of the first network client and (ii) assign data flowing between the first network client and the hub to one or more of the plurality of access communication networks at least partially based on the subscription policy information, the capabilities of the first network client, and the network characteristics.

13. The hub of claim 11, wherein the subscription policy information comprises one or more of (a) communication network bandwidth provisioned to the first network client, (b) access traffic steering, (c) switching and/or splitting restrictions, (d) maximum data transfer latency specifications, (e) time of day and/or day of week use restrictions, (f) priority information, (g) geographic use restrictions, and (h) data type restrictions.

14. The hub of claim 11, further comprising an application programming interface for customization of the converged access integrated controller.

* * * * *